S. J. BUCKLAND.
FRONT FORK EQUALIZER.
APPLICATION FILED DEC. 21, 1908.
940,783.
Patented Nov. 23, 1909.
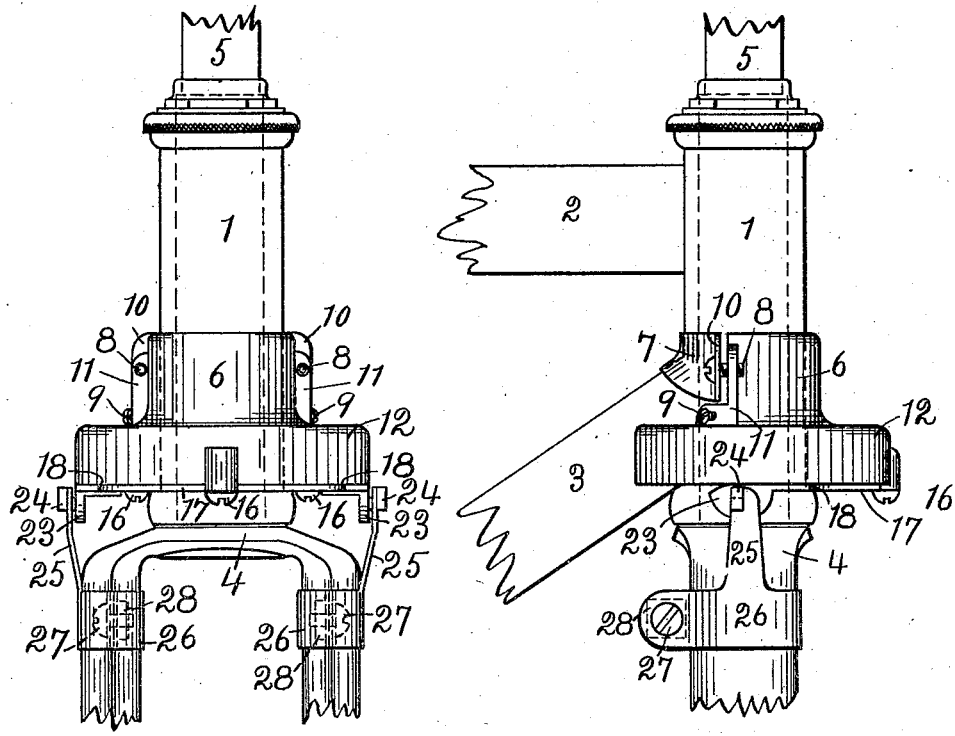
Fig. 1.
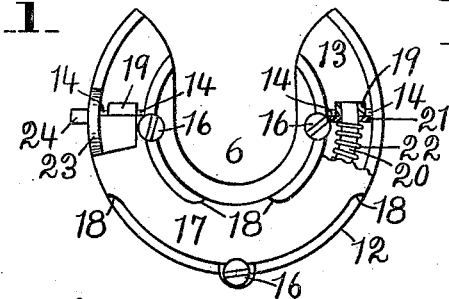
Fig. 2.
Fig. 3.
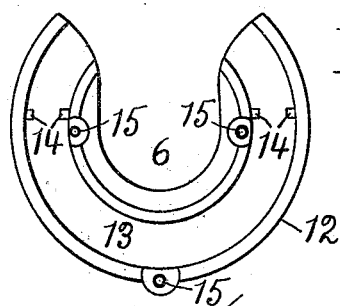
Fig. 4.
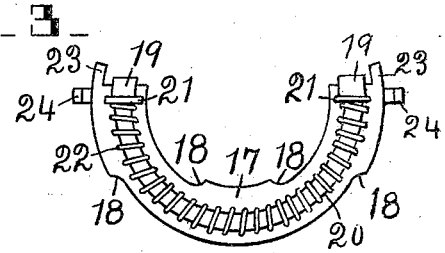
Fig. 5.
WITNESSES:
A. C. Fairbanks.
J. M. Sterns.
INVENTOR.
Seth J. Buckland,
BY
Webster & Co.,
ATTORNEYS.

UNITED STATES PATENT OFFICE.

SETH J. BUCKLAND, OF SPRINGFIELD, MASSACHUSETTS.

FRONT-FORK EQUALIZER.

940,783.  Specification of Letters Patent.  Patented Nov. 23, 1909.

Application filed December 21, 1908. Serial No. 468,451.

*To all whom it may concern:*

Be it known that I, SETH J. BUCKLAND, a citizen of the United States of America, residing at Springfield, in the county of Hampden and State of Massachusetts, have invented a new and useful Front-Fork Equalizer, of which the following is a specification.

My invention relates to improvements in devices designed to retain the front fork, steering-post or equivalent member of a bicycle, motor cycle, automobile, or similar vehicle, or the steering-post of the rear running gear of a hook-and-ladder truck, in the position to cause the wheel or wheels upon which such fork, steering-post or equivalent member is or are mounted to track with the other wheel or wheels of the same vehicle, or, in other words, to keep normally said front fork, steering-post, or equivalent member in such a position that the supporting axle therefor shall be parallel with the other axle.

Broadly my invention comprises a suitably mounted, compressible and expansible member arranged with its axis in the form of an arc of a circle, fixed and movable abutments and stop members for the ends of such compressible and expansible member, and means whereby the device can be securely attached to the frame or body of a vehicle and properly connected with the steering member of such vehicle, all as hereinafter set forth.

The object of my invention is to provide a simple but reliable equalizer, of the class described, which can be readily attached to any vehicle that has a rotary steering member, and which when properly mounted tends always to retain the front and back wheels in alinement, and to restore them to this condition whenever such condition is disturbed.

The device or appliance not only does not interfere with the steering of the machine or vehicle to which it is attached, but on the contrary is of considerable assistance in that operation, since it affords some little resistance to the operator while in the act of steering or of deviating said machine or vehicle from a straight course, and so serves to steady said action, and upon the relaxation of the steering-gear, after being turned in one direction or the other by the operator, the appliance immediately acts to throw said steering-gear back into normal position or condition again or to assist in so doing. Furthermore, the equalizer absorbs as it were the shock occasioned by the encounter of a steering wheel with which it is connected with an obstacle in the road, and so prevents an undue amount of deviation on the part of said wheel and quickly returns the wheel to normal position in the same way as when the wheel is caused to deviate intentionally or by the will of the operator.

The invention is particularly useful for bicycles and motor cycles in preventing the front fork from turning sidewise, when the machine is placed near a curb with one pedal on the curb to hold said machine in an upright position, and so upsetting the machine, as very frequently happens at the present time; and said invention is especially adapted to retain the front fork of a bicycle, with its wheel, in normal position while the bicycle is being held by the back wheel or the rear fork of said bicycle and trundled up and down stairs on said front wheel, which is something that is quite impossible to do without the equalizer.

I attain the object and secure the advantages above pointed out by the means illustrated in the accompanying drawings, in which—

Figure 1 is a front elevation of the head and portions of the front fork and steering-post of a bicycle, showing my equalizer applied to said head and fork; Fig. 2, a side elevation of the parts which appear in the preceding view; Fig. 3, a bottom view of the equalizer detached from the frame head of the bicycle and without the clips by means of which connection is had with the front fork of said frame, one end of the segmental bottom plate being broken away in order to show the interior construction and arrangement of parts and the normal relative positions of such parts to better advantage; Fig. 4, a bottom view of the case, and, Fig. 5, a top, plan view of the spring and the supporting members therefor.

Similar figures refer to similar parts throughout the several views.

In the first two views I show the head 1, portions of the top bar 2 and the bottom bar 3, the upper part of the front fork 4, and the steering-post 5 of an ordinary bicycle frame, said steering-post rising from said fork through said head and being broken off at the top. These or similar members are those with which my invention is generally associated and connected.

The equalizer illustrated in the drawings consists of the members which I will now describe together with the auxiliary parts or connections. A case 6 is provided which is constructed and adapted to fit on to the front of the head 1 and to be there held securely by means of a clip 7 and screws 8—8 and 9—9. The shape of the clip 7 is such that said clip fits snugly on to the back of the head 1 and over the top of the bottom bar 3 at and adjacent to the junction of such bar with said head. Each screw 8 passes through a lateral ear 10 at one end of the clip 7 into threaded engagement with a lateral lug 11 on the outside of the case 6. Each screw 9 is tapped into the lower part of one of the two lugs 11 and passes through the same into contact with the head 1, the axis of such screw being radial to the axis of said head, at least it is preferably so. When the screws 8 and 9 are tightened the case 6 is drawn and held firmly against the head by said screws and by the clip 7. As will be observed, the screws 9 are located well back of the transverse, vertical, central plane of the head, so that they afford material assistance to the other screws and the clip 7. Upon removing the screws 8 from the lugs 11 and loosening the screws 9 the case 6 with the parts supported thereby can be removed from the head 1.

The case 6 is segmental in form and has an enlarged, flaring or bulging base 12 which is also segmental. Within this base, which is open underneath, is a channel 13 into which extend two pairs of vertical abutments 14. The abutments 14 are situated just behind the lateral, diametral center of the base 12, and the abutments in each pair are oppositely disposed relative to each other. Three vertical holes 15, one in front and two behind, but spaced apart, as shown in Fig. 4, are tapped into the base 12 from below for a corresponding number of screws 16. The front hole 15 is in the outer wall of the channel 13 while the other two holes 15 are in the inner wall of said channel. The portions of the base 12 in which the aforesaid holes are made are built out somewhat from the walls of the channel 13 and extend a little below such walls, the distance of such extension being approximately equal to the thickness of a segmental plate 17 which is held in place by the screws 16.

The segmental plate 17 covers the open bottom of the channel 13, being supported by the heads of the screws 16 between such heads and the base 12. The plate 17 is not only supported on the heads of the screws 16, as stated, but is guided by said screws in its movement around the axis of the case 6, which axis is the same as that of the head 1 and steering post 5 and of the plate itself. Thus it will be seen that the plate 17 is supported from below and at the edges by the screws 16 and also guided by the latter. Shoulders 18 on the outer and inner edges of the plate 17 are so arranged as to contact with the screws 16, whenever said plate is turned in either direction, and thus to afford positive means for limiting the amount of such movement, one or the other of the outer shoulders contacting with the outer screw, according to the direction given said plate, and one or the other of the inner shoulders at the same time contacting with one or the other of the inner screws. Either set or pair of the shoulders 18 may be omitted from one edge of the plate, or there might be a single shoulder on each edge provided the two were on the same side of a line passing through the axis of the plate and through the center of the outer screw 16. Rising into the channel 13 from the plate 17 at the ends are two abutments 19 each of which is of a width that permits it to enter between the abutments 14 with which it is associated, so that as said plate is turned in opposite directions said butments 19 pass both ways through the spaces between the abutments 14 in both pairs. A segmental support or rod 20 has its ends rigidly secured to the abutments 19, and is held by the latter in the channel 13 over the plate 17. Mounted on the curved rod 20 are two stop members or washers 21 and a compressible and expansible member in the form, in the present instance and preferably, of a spiral-spring 22. The spiral-spring 22 bears with its ends against the washers 21. These washers are too large to pass between the adjacent abutments 14. The rod 20 is of the right length to permit the abutments 19 to stand between the abutments 14, with the inner faces of the former flush with the inner faces of the latter, and the washers 21 are pressed against their adjacent abutments 14 and 19 by the spiral-spring 22 when the abutments 19 are positioned as stated, said spring acting on the one hand to force said washers into the aforesaid position and on the other hand to draw the abutments 19 against the washers through the medium of said rod. This is the normal position and condition of the spring-pressed members, since the force of the spiral-spring, which spring is always in a state of compression, is then equally distributed and one end balances or equalizes the other end. Now if the plate 17 be turned about its axis in either direction, the spring 22 will be compressed more than before and to a degree which accords with the amount of rotation given said plate, that is to say, the more the plate is turned the greater will be the compression of the spring and the greater the power required to overcome the resistance of the spring, consequently the greater will be the force exerted by the spring when released and the more power it will have to restore the normal relation of the parts controlled thereby. The increased compression of the spring 22 is due to the fact that, as the plate 17 is turned, one of the abutments 19 moves outward and leaves the washer 21 and the spring at that end bearing against the associated abutments 14, while the other abutment 19 moves inward taking with it the washer 21 at that end and compressing said spring between the last-mentioned washer and the other washer which is still in contact with its abutments 14. To state it a little differently, whichever way the plate is turned, one abutment 19 moves outward away from its associated abutments 14, leaving the adjacent washer behind as the rod 20 slides through the latter, and the other abutment 19 moves forward away from its associated abutments 14, carrying with it the contacting washer and compressing the spring.

Upon the release of the plate 17, the spiral-spring 22 immediately acts to return said plate to initial or normal position, as will be readily understood from the foregoing explanation.

On the underside of the plate 17 at the ends are two depending ears 23, from which project two lateral and upwardly-directed hooks 24. The hooks 24 are engaged by the upper, hooked ends of two arms 25 which rise from the same number of clips 26 on the legs of the fork 4. Each clip 26 is clasped around one of the legs of the fork 4 and there held securely by means of a screw 27 and a nut 28, and the arm 25 rises from the upper edge of the outer side of said clip. The hooked ends of the arms 25 engage the horizontal portions of the hooks 24 in front, and above and below, so that the plate 17 receives additional support in this way and must always move with the fork 4 whenever said fork turns or is turned in either direction. Contrariwise, the plate 17 whenever actuated by the spiral-spring 22 acts through the medium of the hook connections and the clips 26 to rotate the fork 4 and to bring it into position with its wheel in line with the rear-wheel.

It must be clear now how the equalizer has a constant tendency to keep the fork 4 and the steering-post 5 in normal position, and to return them to such position whenever designedly or otherwise they are turned to the right or to the left. Thus it is that the bicycle is rendered more reliable and manageable, not only while being ridden, but at other times as well.

While most of the curved or segmental parts shown and described are semi-circular or approximately so, the base 12 of the case 6 exceeds this dimension to a sufficient extent to afford a covering for either terminal of the plate 17 and the members carried thereby when said plate occupies either of its extreme positions.

There may be some considerable variation in the size and shape and even in the construction otherwise of some or all of the parts which enter into the formation of my invention without departing from the nature of such invention, and although denominated a "front-fork" equalizer and particularly described and illustrated as such, nevertheless it is plain that the invention is applicable to different kinds of steering members, such as have been mentioned in the early part of this description, without other change than would be needed in making the connections in the new relation.

What I claim as my invention, and desire to secure by Letters Patent, is—

1. An equalizer, of the class described, comprising a suitably mounted compressible and expansible segmental member, fixed abutments and stop members adapted to limit the outward movement of such segmental member at the ends, and movable abutments adapted to be moved one against one end of said segmental member inward from the adjacent fixed abutment and the other away from the other end of said segmental member outward from the adjacent fixed abutment to compress it between one of said fixed abutments and one of said movable abutments, said stop members intervening between the ends of the segmental member and on one hand the fixed abutment and on the other hand the movable abutment when such compression takes place.

2. An equalizer, of the class described, comprising a fixed member provided with abutments, a member arranged in rotary sliding relation to such fixed member and provided with abutments which are adapted to pass said first-mentioned abutments, segmental supporting means connected to the abutments on such rotary sliding member, stop members loosely mounted on such supporting means, such stop members being incapable of passing the abutments on said fixed member, and a compressible and expansible member on said supporting means between said stop members.

3. An equalizer, of the class described, comprising a fixed member provided with abutments, a member arranged in rotary sliding relation to such fixed member and provided with abutments which are adapted to pass said first-mentioned abutments, positive means to limit the movement of the rotary sliding member, segmental supporting means connected to the abutments on such rotary sliding member, stop members loosely mounted on such supporting means, such stop members being incapable of passing the abutments on said fixed member, and a compressible and expansible member on said supporting means between said stop members.

4. The combination, in an equalizer of the class described, with a suitable case provided with abutments, of a plate arranged in rotary sliding relation to such case and provided with abutments which are adapted to pass said first-mentioned abutments, a segmental support between the plate abutments, washers loosely mounted on such support and incapable of passing said case abutments, and a spiral-spring on said support between said washers.

5. The combination, in an equalizer of the class described, with a fixed part of a vehicle, a suitable case provided with abutments, and means to secure such case to such fixed part of a vehicle, of a plate arranged in rotary sliding relation to said case and provided with abutments which are adapted to pass said first-mentioned abutments, a curved support between the plate abutments, washers loosely mounted on such support and incapable of passing said case abutments, a spiral-spring on said support between said washers, a steering member on said vehicle, and suitable means for connecting said plate with said steering member.

6. The combination, in an equalizer of the class described, with the head of a bicycle frame, and the front fork of the bicycle, of a case adapted to fit such head and provided with a segmental channel having abutments therein, means to fasten said case to said head, a plate covering said channel and arranged to turn at about the same axis as said fork, abutments extending from said plate into such channel, such plate abutments being adapted to pass the abutments in the channel, a segmental rod between said plate abutments, washers loosely mounted on such rod and incapable of passing said case abutments, a spiral-spring on said rod between said washers, projections on the plate, clips secured to the legs of said fork, and arms rising from said clips to engage said projections and lock the plate to the fork.

SETH J. BUCKLAND.

Witnesses:
F. A. CUTTER,
A. C. FAIRBANKS.